United States Patent [19]

Hyz et al.

[11] 4,306,384

[45] Dec. 22, 1981

[54] PRECISION MACHINE TOOL WORKPIECE POSITIONING APPARATUS

[76] Inventors: Al Hyz, 108 Alder Ct., Rolling Meadows, Ill. 60008; Paul J. Wietrzyk, 1617 Wood St. N. Rear, Chicago, Ill. 60622

[21] Appl. No.: 139,446

[22] Filed: Apr. 11, 1980

[51] Int. Cl.³ ............................................. B24B 41/06
[52] U.S. Cl. ............................. 51/217 R; 51/165 R; 51/277
[58] Field of Search ......... 408/241 S; 51/277, 165.81, 51/165 R, 238 GG, 217 R; 125/11 N

[56] References Cited

U.S. PATENT DOCUMENTS

| | | | |
|---|---|---|---|
| 1,585,984 | 5/1926 | Heim | 51/238 GG |
| 2,390,367 | 12/1945 | Swenson | 51/165.81 |
| 2,888,005 | 5/1959 | Goeke | 125/11 N |
| 3,094,821 | 6/1963 | Eckert | 269/82 |
| 3,826,047 | 7/1974 | Binder | 51/277 |
| 4,139,189 | 2/1979 | Wietrzyk | 269/272 |

Primary Examiner—Harold D. Whitehead
Attorney, Agent, or Firm—Allegretti, Newitt, Witcoff & McAndrews

[57] ABSTRACT

A workpiece positioning apparatus for a precision machine tool includes an abutment member having an end for abutment by a workpiece mounted on a body. A fastener passageway extends through the body from an end surface to a peripheral surface. A fastener is movably mounted in the fastener passageway for driven movement through the peripheral surface to wedge the body in a passage of the machine tool.

6 Claims, 3 Drawing Figures

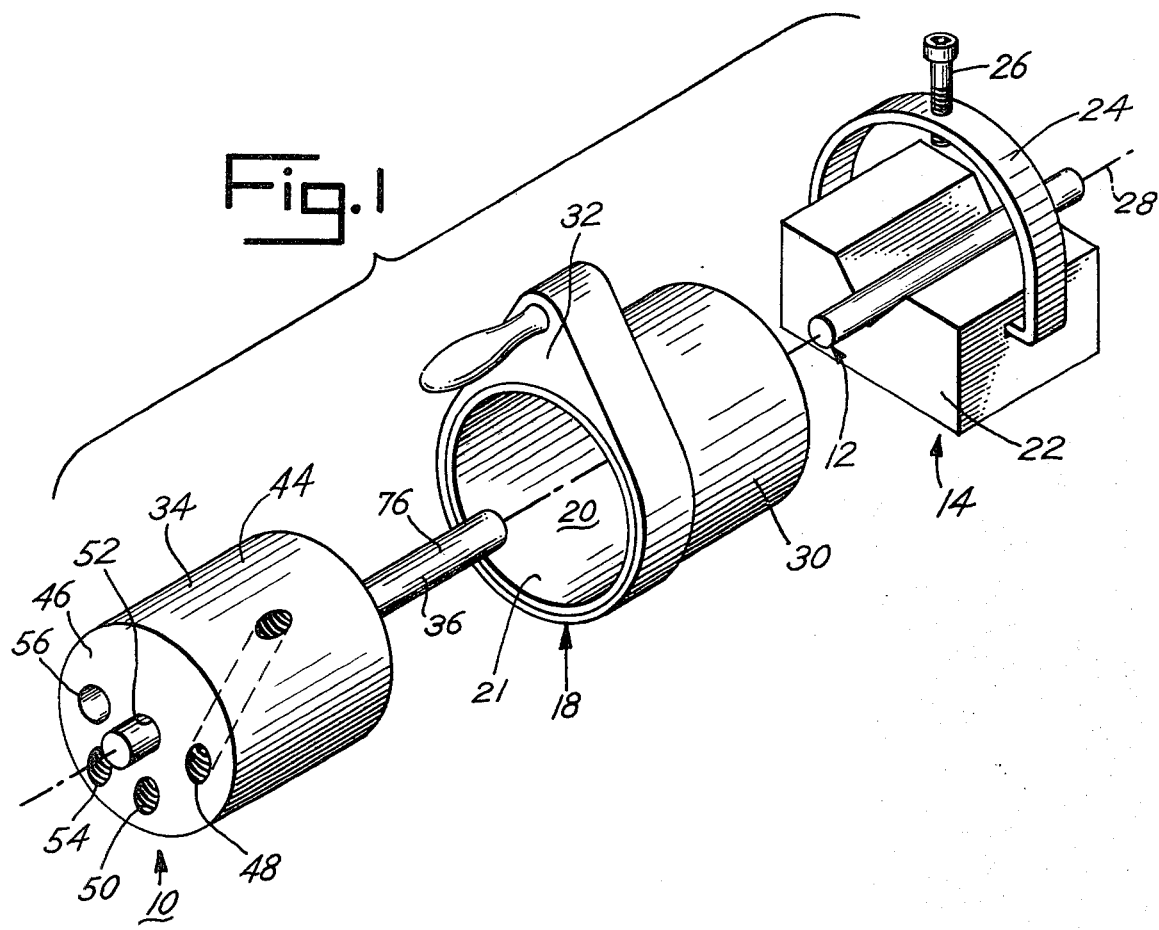
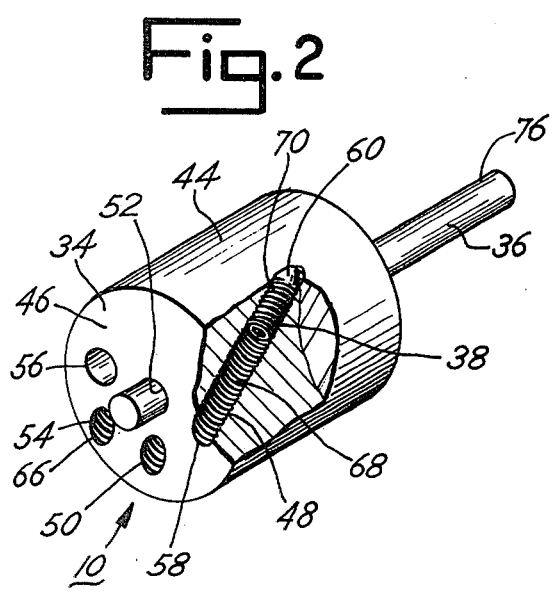
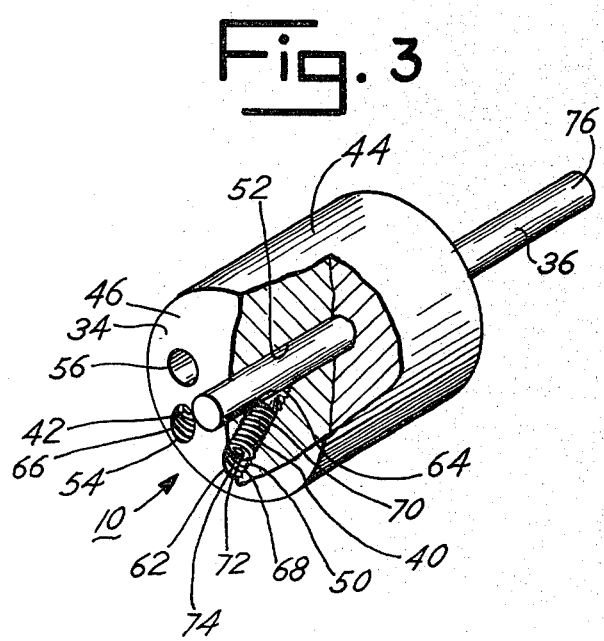

PRECISION MACHINE TOOL WORKPIECE POSITIONING APPARATUS

BACKGROUND OF THE INVENTION

This invention relates to precision machining equipment, and more particularly, to a workpiece positioning apparatus for a precision machine tool.

In the production of multiple, interchangeable machine components and the like, machine shop tools such as machine lathes and the grinding fixtures of U.S. Pat. No. 3,094,821 issued on June 25, 1963 to T. Eckert have long been utilized. Through the use of these tools, the production of critical dimensions in a plane perpendicular to the longitudinal axes of mounted workpieces, i.e. transverse dimensions, has been greatly facilitied. Workpieces can be swiftly, interchangeably mounted upon such tools with assurance that the positioning of the workpieces in the transverse plane will be unchanging. However, satisfactory positioning in the direction of the longitudinal axes of the workpieces has never been accomplished. No longitudinal positioning apparatus is known to exist for the grinding apparatus of U.S. Pat. No. 3,094,821 and only one apparatus is known to exist for machine lathes. This apparatus consists of a body which is threadably mounted within a collet and within which a rod is threadably mounted. A lock nut on the rod maintains the position of the rod within the body. Thus, the known apparatus has the disadvantages of the imprecision and cost inherent in threaded joints and further can be troublesome to use, since loosening of the rod relative to the body tightens the body relative to the collet and vice versa. Further, the adjustment of the apparatus requires at least two wrenches, and can be bothersome.

SUMMARY OF THE INVENTION

Thus, an object of the present invention is to provide an improved workpiece positioning apparatus for a precision machine tool.

Another object of the present invention is to provide a workpiece positioning apparatus for a precision machine tool for providing facile reproduction of critical dimensions in the direction of the longitudinal axis of a workpiece.

Another object of the present invention is to provide an improved workpiece positioning apparatus for a precision machine tool that is readily utilized.

Another object of the present invention is to provide an improved workpiece positioning apparatus for a machine tool that is economical of manufacture.

These and other objects and advantages are satisfied by the present invention, which, in a principal aspect, is an improved workpiece positioning apparatus for a precision machine tool. The machine tool is of the type having a mechanism for grasping the workpiece and defining a passage with a passage wall adjacent the mechanism. The apparatus comprises a body, fastener means, and an abutment member. The body is adapted to fit within the passage, and has a peripheral surface and an end surface. The body defines a fastener passageway which extends from the end surface through the body to the peripheral surface.

The fastener means is for fastening the body in the passage. The fastener means is movably mounted in the fastener passageway for movement through the peripheral surface, to wedge the body in the passage against the passage wall. The fastener means includes receiving means for receiving a driving force to drive its movement.

The abutment member is mounted on the body and has an end. The end extends toward the mechanism for abutment by the workpiece. Thus, the body may be releasably fastened in the passage by application of the driving force to the fastener means, and the workpiece may be positioned by abutment with the end.

BRIEF DESCRIPTION OF THE DRAWING

FIG. 1 is a perspective view of the preferred embodiment of the present invention with a simplified representation of a precision machine tool;

FIG. 2 is a first cut-away view of the preferred embodiment; and

FIG. 3 is a second cut-away view of the preferred embodiment.

DETAILED DESCRIPTION OF THE PREFERRED EMBODIMENT

Referring to FIG. 1 of the accompanying drawing, the preferred embodiment of the present invention is a workpiece positioning apparatus 10. The apparatus 10 comprises means for positioning a workpiece 12 in a precision machine tool having a mechanism 14 for grasping or clamping a workpiece 12 and a structure 18 defining a passage 20 with a passage wall 21 adjacent the mechanism 14.

For illustration, the mechanism 14 includes a V-block 22 and a connected horseshoe-shaped clamp 24 with a clamp screw 26. The V of the V-block 22 defines an axis 28 for coincident orientation of the longitudinal axis of the workpiece 12. The workpiece 12 is clamped to the V-block 22 by action of the clamp screw 26, for precise positioning of the workpiece 12 in the directions transverse to the axis 28.

Also for illustration, the structure 18 includes a sleeve 30 and a crank 32. The sleeve 30 and the passage wall 21 are cylindrical. The central axes of the sleeve 30 and wall 21 are coincident with the axis 28. The crank 32 allows the structure 18 to be manually rotated about the axis 28, thereby allowing the sleeve 30, and thus the structure 18, to be secured in a variety of axial positions.

The apparatus 10 includes a body 34, an abutment member 36, a first fastener 38 (FIG. 2), and a second fastener 40 (FIG. 3). As most preferred, the apparatus 10 further includes a third fastener 42 (FIG. 3). The body 34 is cylindrical, with a cylindrical peripheral wall 44 and a circular, planar end surface 46. The body 34 has an outer diameter substantially equal to and slightly (about one-thousandths of an inch) less than the diameter of the passage 20. The body 34 is thus adapted to be slidably mounted in the passage 20.

Two fastener passageways 48, 50 and an abutment member passageway 52 are defined in the body 34. As most preferred, a third fastener passageway 54 and a second abutment member passageway 56 are also defined in the body 34. The two passageways 52, 56 are parallel to each other and the axis 28; the passageway 52 extends along the central axis of the body 34, and the passageway 56 is radially spaced therefrom. The passageway 48, 50, 54 are parallel to each other, and skewed in relation to the passageways 52, 56. The passageways 48, 52 are skewed from each other to allow facile access to the passageway 48, as will be understood. The passageways 48, 50, 54 are set at an included angle from the plane of the end surface 46 of about seventy-five degrees.

Each of the fastener passageways 48, 50, 54 is radially spaced from the central axis of the body 34. The first fastener passageway 48 extends from the end surface 46 through the body 34 to the midline of the peripheral surface 44. The passageway 48 opens onto both surfaces 44, 46 at intersections 58, 60 (FIG. 2). The second fastener passageway 50 extends from an open intersection 62 with the end surface 46 to the first abutment passageway 52 at an open intersection 64 (FIG. 3) equidistant with the midline of the surface 44. The third fastener passageway 54 extends from an open intersection 66 with the end surface 46 to an open intersection (not shown) with the abutment member passageway 56.

The passageways 48, 50, 54 are each threaded with internal threads 68.

The fasteners 38, 40, 42 are each externally threaded with external threads 70. The threads 70 mate the threads 68. The fasteners 38, 40, 42 are thus movably mounted in the fastener passageways 48, 50, 54: the fastener 38 is mounted in the passageway 48; the fastener 40 is mounted in the passageway 50; and the fastener 42 is mounted in the passageway 54. Each of the fasteners 38, 40, 42 has a head 72 (FIG. 3) which defines a tool-receiving socket 74. The heads 72 face the end surface 46. The fasteners 38, 40, 42 are thus driven through their respective passageways 48, 50, 54 by a tool (not shown) such as an allen wrench upon the application of driving force to the fasteners.

The abutment member 36 is a smooth, cylindrical rod having an end 76 facing the mechanism 14. The passageways 52, 56 are smooth and cylindrical, and have an identical diameter substantially equal to and slightly greater than the diameter of the member 36. Thus, the member 36 is adapted to be slidably mounted in the passageway 52, 56 of choice.

As now structurally described, the apparatus 10 is utilized as follows. The body 34 is slid into the passage 20 and the fastener 38 is driven to protrusion through the peripheral surface 44. The protruding end of the fastener 38 contacts the wall 21 and wedges the body 34 against the wall 21. The body 34 is then in position to receive the member 36. The member 36 is slid into either the passageway 52 or the passageway 56, to be in alignment with the workpiece 12. The passageway 56 allows for workpieces which are positioned above the V of the V-block 22, and for a raised or lowered V-block 22. Using placement in the passageway 52 as exemplary, the member 36 is longitudinally positioned as desired so that the end 76 acts as a longitudinal stop for the workpiece 12. The fastener 40 is driven to protrusion into the passageway 52, where it wedges the member 36 in the passageway 52. The member 36 is thereby snugly positioned in the body 34, and the body 34 in the sleeve 30, to provide a stop which is maintained through as many machining operations on the workpiece 12 and subsequent workpieces as desired.

As should now be apparent, the apparatus 10 and the associated precision machine tool have been described above in such full, clear, and concise and exact terms as to enable any person skilled in the art to which the apparatus 10 pertains to make and use the same. A more fully detailed description of an exemplary machine tool is contained in U.S. Pat. No. 3,094,821. A highly desirable improvement of such a tool is described in U.S. Pat. No. 4,139,189 issued on Feb. 13, 1979 to Paul J. Wietrzyk for Block Centers. Both these patents are incorporated in this specification by reference.

To particularly point out and distinctly claim the subject matter regarded as invention, the following claims conclude this specification.

What is claimed is:

1. A workpiece positioning apparatus for a precision machine tool having a mechanism for grasping the workpiece and defining a passage with a passage wall adjacent the mechanism, the apparatus comprising:

a body adapted to fit within the passage, having a peripheral surface, a first end surface and a second end surface, defining a first fastener passageway extending from the first end surface through the body to the peripheral surface, defining an abutment member passageway having a passageway wall and extending from the first end surface through the body to the second end surface, and further defining a second faster passageway extending from the first end surface through the body to the passageway wall;

first fastener means for fastening the body in the passageway, the first fastener means being movably mounted in the first fastener passageway for movement through the peripheral surface to wedge the body in the passage against the passage wall and having first receiving means for receiving a first driving force to drive the movement;

an abutment member mounted on the body in the abutment member passageway and having an end extending from the second end surface toward the mechanism for abutment by the workpiece;

second fastener means for fastening the abutment member in the abutment member passageway, the second fastener means being movably mounted in the second fastener passageway for movement through the passageway wall to wedge the abutment member in the abutment member passageway and having second receiving means for receiving a second driving force to drive the movement;

whereby the body may be releasably fastened in the passage by application of the first driving force to the first fastener means and the abutment member may be releasably fastened in the abutment member passageway by application of the second driving force to the second fastener means, so that the workpiece may be accurately positioned by abutment with the end of the abutment member.

2. An apparatus as claimed in claim 1 in which the body is adapted to be slidably mounted in the passage.

3. An apparatus as claimed in claim 1 in which the passageway is annular and the body is cylindrical, the peripheral surface being a cylindrical surface of the body.

4. An apparatus as claimed in claim 1 in which the first and second fastener means each includes a screw threadably mounted in the respective fastener passageway.

5. An apparatus as claimed in claim 1 in which the first and second receiving means each includes a head defining a tool-receiving socket.

6. An apparatus as claimed in claim 1 in which the abutment member passageway defines a first axis and the first fastener passageway defines a second axis, the second axis being skewed from the first axis so that the first and second axes are non-intersecting.

* * * * *